Aug. 9, 1927.
B. STOUGHTON
1,638,174
APPARATUS FOR TESTING MAGNETIZABLE OBJECTS
Filed Jan. 19, 1924
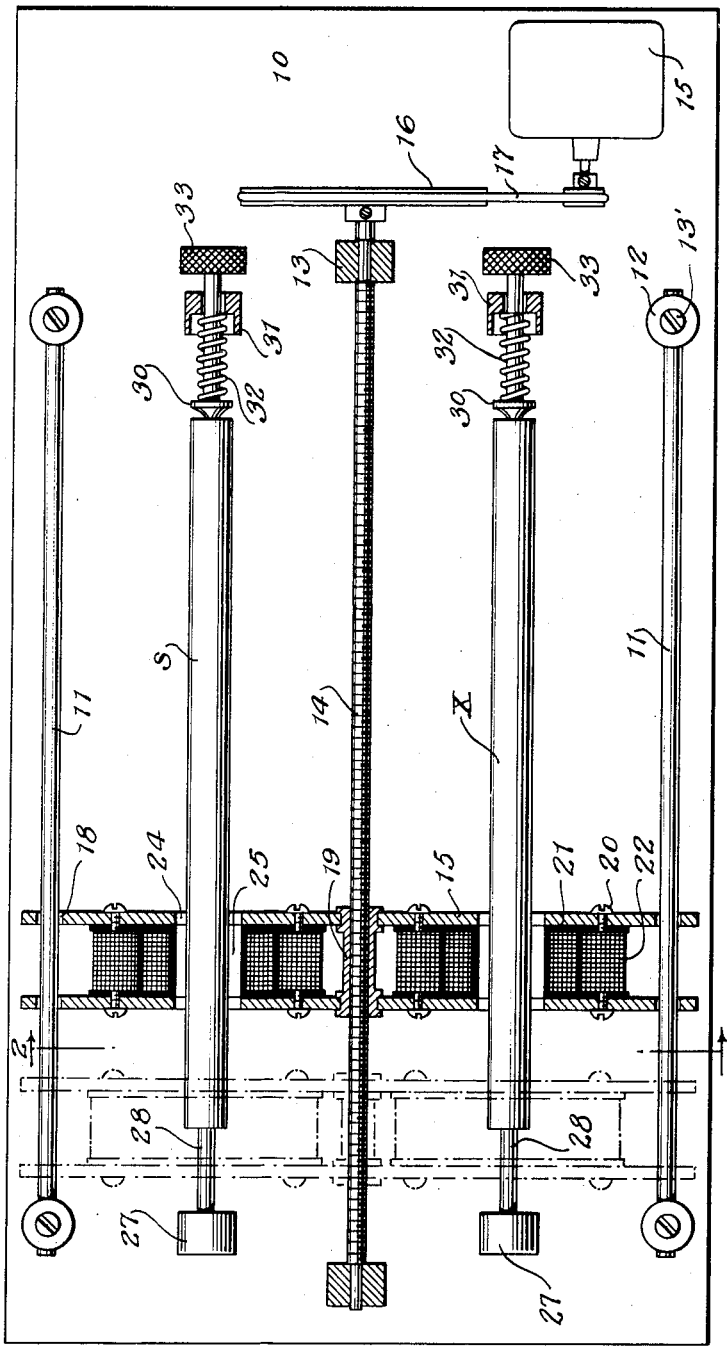
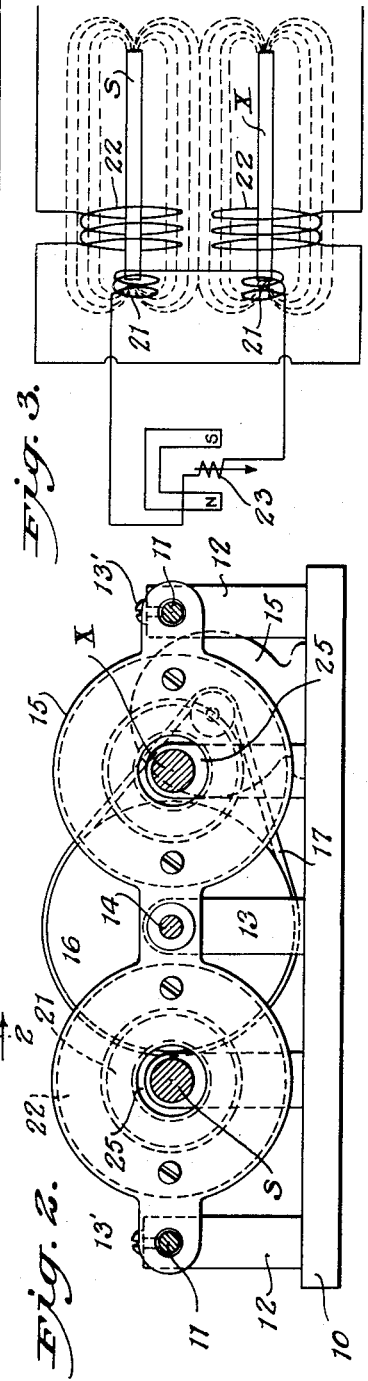
INVENTOR
Bradley Stoughton
BY
ATTORNEY Patented Aug. 9, 1927.

1,638,174

UNITED STATES PATENT OFFICE.

BRADLEY STOUGHTON, OF BETHLEHEM, PENNSYLVANIA, ASSIGNOR TO BURROWS MAGNETIC EQUIPMENT CORPORATION, OF JERSEY CITY, NEW JERSEY, A CORPORATION OF DELAWARE.

APPARATUS FOR TESTING MAGNETIZABLE OBJECTS.

Application filed January 19, 1924. Serial No. 687,354.

This invention relates to improvements in apparatus for testing magnetizable objects, particularly to apparatus for making a directly comparative test.

It is an object of the present invention to provide means which will enable one specimen to be compared throughout its entire length with a standard specimen, even though there might be a slight discrepancy between the relative lengths of the specimens.

It is a further object of the invention to provide an apparatus which will be extremely accurate and at the same time, practical for commercial use.

The invention also contemplates the provision of an apparatus dependent for its operation upon relative movement between the specimen and the magnetizing field wherein novel means is provided for supporting the specimen and for producing the relative movement.

With these and other objects in view, the invention consists in certain novel features of construction and combinations and arrangements of parts as will be more fully described and pointed out in the claims.

In the accompanying drawings,

Fig. 1 is a plan view with parts broken away and in section for clearness of my improved apparatus, the dotted lines indicating another position of the travelling carriage, Fig. 2 is an end view of Fig. 1, and Fig. 3 is a wiring diagram.

Referring with particularity to Figs. 1 and 2 of the drawings, it will be seen that I have used the reference character 10 to indicate a base or bed plate, upon which the apparatus is mounted. Carriage guide rails 11, 11 are supported above the base at each side thereof by posts 12, set screws 13 being utilized for firmly securing the guide rails in place.

A screw 14 extending in parallelism with the guide rails 11 has its ends mounted rotatably in post 13, rising from the base 10. This screw is the actuating medium for a carriage 15 of insulating material which slides upon the guide rails. Any suitable means may be utilized for rotating the screw to actuate the carriage.

For purposes of illustration, I have shown an electric motor 15 driving a pulley 16 at one end of the screw through the intermediacy of a power transmitting device, such as the endless belt 17.

The carriage consists of a pair of plates provided at their ends with aligned openings 18 to accommodate the guide rails 11. A threaded bushing 19 connects the intermediate portions of the plates and has screw threaded engagement with the screw 14, the bushing and screw co-acting to produce sliding movement of the carriage 15 on the rails. Between the plates which form the carriage 15 and secured to each plate by screws or similar securing devices 20 are pairs of coils. Each pair of coils consists of an inner secondary or exploring coil 21, and an outer primary or field producing coil 22 concentric with the coil 21.

As seen most clearly in Fig. 3, the primary coils 22 are connected in series with any suitable source of alternating current. The coils 22 are preferably identical so that the magnetic fields which they produce are of equal intensity. The secondary exploring coils 21 are also similar and are connected in series and opposition with the potential coil 23 of a dynamometer to form a closed secondary or exploring circuit. Openings 24 in the plates of the carriage 15 register with the central openings 25 of the secondary coils 21, so that specimens in the form of rods to be tested may be passed through the carriage and coils.

I have shown for the purpose of illustration, a pair of steel rods, the rod S being the standard specimen and the rod X being the specimen of unknown physical characteristics. The invention in the present case resides partially in the provision of novel means for securing these rods in place, so that they may be held stationary and in proper relative position as the carriage 15 carrying the field producing and exploring coils is moved along the guide rails. Posts 27 rising from the base are provided with laterally extending arms 28 in alignment with the openings 24 and 25 of the carriage 15. The arms 28 are preferably of smaller cross section than the specimens to be tested. In any event, the arms are of less diameter than the aligned openings 24, 25. One end of the standard specimen and one end of the specimen to be tested are adapted to respectively abut against the ends of the arms 28. The arms 28 being of equal length and the posts 27 occupying corresponding positions on opposite sides of the center of the base plate insure the positioning of one end of each specimen in exact alignment relative to the transverse plane of the base plate and consequently, the plane of the carriage 15.

Any convenient means of holding the ends of the specimens against the ends of the arms 28 might be employed. I have shown one convenient clamping means which consists of spring impelled plungers 30 mounted in brackets 31 rising from the base. Springs 32 around the plungers impel them into engagement with the ends of the two specimens, consequently, holding the opposite ends of the specimens firmly pressed against the ends of the arms 28. Handles 32 on the plungers 30 facilitate manual retraction of the plungers and the expeditious insertion, removal or reversal of a specimen.

The importance of some readily operable means for securing the specimens in place will be apparent and the advantage of holding the extremity of specimen X in perfect alignment with the extremity of specimen S may be understood by an examination of the diagrammatic showing of Figure 3.

Figure 3, I have shown the normal path of the magnetic flux of which the specimens S and X form a part when the field producing coils 22 are energized. The exploring coils 21 are sensitive respectively to the lines of magnetic force passing through the respective specimens. They may, if desired, be so arranged that they are sensitive only to the leakage of such lines. It is apparent that when comparative testing of the two specimens takes place and the test coils 21 move over the ends of the specimens, there will be considerable difference in the lines of force intersecting the test coils unless the ends of the specimens be in perfect alignment. It has heretofore been customary to avoid this difficulty by testing merely the central portions of the specimens, but the inadvisability of such a method is clearly apparent, especially when testing inhomogeneities.

A flaw, such as a crack, blow hole or other physical defect is just as likely to occur in the extreme end of a specimen as in any other part and accurate testing requires that the ends be inspected. The apparatus which I have shown makes possible not only the examination of the extreme ends of the specimens, but makes possible a comparative examination of such extreme ends.

If specimen X be of greater or less length than the standard specimen, it is a simple matter to inspect the major portion of the length of such specimen and one end thereof by a single movement of the carriage 15 along the rails 11. To inspect the other end of the specimen X, it is merely necessary to manually retract plunger 32 and reverse the position of the specimen. It is not important so far as the present invention is concerned just what physical characteristic of the specimen is examined or just what type of indicating instrument is used. For purposes of illustration only, we have described a homogeneity test and shown a dynamometer for registering variations in the magnetic effects of the two specimens upon the two test coils.

It will be understood, therefore, that while I have shown a preferred embodiment of the invention, various changes and alterations might be made in the general form and arrangement of the parts described without departing from the invention, and hence I do not wish to limit myself to the precise details set forth, but shall consider myself at liberty to make such changes and alterations as fairly fall within the spirit and scope of the appended claims.

I claim:

1. In apparatus of the class described, a pair of magnetic testing means connected for comparative testing of a pair of specimens, means for supporting a pair of specimens to be tested, means for producing relative movement of the testing means and specimens, said supporting means being constructed to position an end of each specimen in a common plane normal to the plane of relative movement of the specimens and testing means, said supporting means being of a character to permit relative movement of the testing means to and beyond such aligned extremities of the specimens.

2. Apparatus of the class described including means for supporting a pair of specimens, a traveling carriage movable longitudinally of the length of the specimens, said specimens each having an end disposed in a common plane normal to the plane of movement of the carriage, testing means mounted on said carriage and including bucked test coils encircling the specimens, said specimen supporting means including stops against which the aligned ends of the specimens abut.

3. Apparatus of the class described including means for supporting a pair of specimens, a traveling carriage movable longitudinally of the length of the specimens, said specimens each having an end disposed in a common plane normal to the plane of movement of the carriage, testing means mounted on said carriage and including bucked test coils encircling the specimens, said specimen supporting means including stops against which the aligned ends of the specimens abut, said stops being of sufficiently small cross section to permit the passage of the test coils thereover.

4. Apparatus of the class described including means for supporting a pair of specimens, a traveling carriage movable longitudinally of the length of the specimens, said specimens each having an end disposed in a common plane normal to the plane of movement of the carriage, testing means mounted on said carriage and including bucked test coils encircling the specimens, said specimen supporting means including stops against which the aligned ends of the specimens abut, and including clamping means engageable with the other ends of the specimen to hold the same against the stops.

5. Apparatus of the class described including means for supporting a pair of specimens, a traveling carriage movable longitudinally of the length of the specimens, said specimens each having an end disposed in a common plane normal to the plane of movement of the carriage, testing means mounted on said carriage and including bucked test coils encircling the specimens, said specimen supporting means including stops against which the aligned ends of the specimens abut, and including spring impelled clamping members engageable with the other ends of the specimen to hold the same against the stops.

BRADLEY STOUGHTON.